(12) United States Patent
Toya et al.

(10) Patent No.: US 10,497,953 B2
(45) Date of Patent: Dec. 3, 2019

(54) FUEL CELL ACTIVATION APPARATUS, FUEL CELL ACTIVATION METHOD, AND FUEL CELL ACTIVATION SYSTEM

(71) Applicant: Panasonic Corporation, Osaka (JP)

(72) Inventors: Shoichi Toya, Hyogo (JP); Yasuo Takebe, Kyoto (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 740 days.

(21) Appl. No.: 14/387,588

(22) PCT Filed: Jan. 29, 2014

(86) PCT No.: PCT/JP2014/000437
§ 371 (c)(1),
(2) Date: Sep. 24, 2014

(87) PCT Pub. No.: WO2014/119291
PCT Pub. Date: Aug. 7, 2014

(65) Prior Publication Data
US 2015/0333350 A1    Nov. 19, 2015

(30) Foreign Application Priority Data
Jan. 31, 2013    (JP) .................................. 2013-017790

(51) Int. Cl.
*H01M 8/04* (2016.01)
*H01M 16/00* (2006.01)
(Continued)

(52) U.S. Cl.
CPC ... *H01M 8/04597* (2013.01); *H01M 8/04225* (2016.02); *H01M 8/04302* (2016.02); *H01M 8/04955* (2013.01); *H01M 16/006* (2013.01)

(58) Field of Classification Search
None
See application file for complete search history.

(56) References Cited

U.S. PATENT DOCUMENTS 8,159,087 B2    4/2012    Miyauchi et al.
8,597,839 B2    12/2013    Kanazu
(Continued)

FOREIGN PATENT DOCUMENTS

EP    2 717 370    4/2014
JP    2000-341881    12/2000
(Continued)

OTHER PUBLICATIONS

Extended European Search Report dated Feb. 1, 2016 in corresponding European Application No. 14745973.9.
(Continued)

*Primary Examiner* — Amanda J Barrow
(74) *Attorney, Agent, or Firm* — Wenderoth, Lind & Ponack, L.L.P.

(57) ABSTRACT

A fuel cell activation apparatus including: a storage battery; a first current sensor detecting a current outputted by the storage battery; a first switch switching between supplying the current outputted by the storage battery and supplying a current provided from the system power supply; a second switch switching between transmitting a result of detecting by the first current sensor and transmitting a result of detecting by a second current sensor which detects the current provided from the system power supply; and a control unit switching between a normal mode for activating, based on the result of detection performed by the second current sensor, the fuel cell using the current provided from the system power supply and a self-sustained mode for (Continued)

activating, based on the result of detection performed by the first current sensor, the fuel cell using the current outputted by the storage battery.

12 Claims, 9 Drawing Sheets

(51) Int. Cl.
　　*H01M 8/04537* (2016.01)
　　*H01M 8/04955* (2016.01)
　　*H01M 8/04225* (2016.01)
　　*H01M 8/04302* (2016.01)

(56) References Cited

U.S. PATENT DOCUMENTS

| | | |
|---|---|---|
| 9,225,047 B2 | 12/2015 | Taniguchi |
| 2006/0063044 A1 | 3/2006 | DeVries |
| 2010/0096927 A1 | 4/2010 | Miyauchi et al. |
| 2011/0039173 A1 | 2/2011 | Kanazu |
| 2011/0291483 A1* | 12/2011 | Yamane .................... H02J 7/35 307/65 |
| 2014/0120382 A1 | 5/2014 | Taniguchi |
| 2014/0361725 A1* | 12/2014 | Nishikawa ................ H02J 9/06 320/101 |

FOREIGN PATENT DOCUMENTS

| | | |
|---|---|---|
| JP | 2005-71987 | 3/2005 |
| JP | 2007-165070 | 6/2007 |
| JP | 2007-207661 | 8/2007 |
| JP | 2007-324140 | 12/2007 |
| JP | 2008-22650 | 1/2008 |
| JP | 2009-89536 | 4/2009 |
| JP | 2010-10050 | 1/2010 |
| WO | 2007/097316 | 8/2007 |
| WO | 2008/102542 | 8/2008 |
| WO | 2012/165516 | 12/2012 |

OTHER PUBLICATIONS

International Search Report dated Apr. 15, 2014 in corresponding International Application No. PCT/JP2014/000437.

* cited by examiner

FUEL CELL ACTIVATION APPARATUS, FUEL CELL ACTIVATION METHOD, AND FUEL CELL ACTIVATION SYSTEM

TECHNICAL FIELD

The present invention relates to fuel cell activation apparatuses, fuel cell activation methods, and fuel cell activation systems. In particular, the present invention relates to a fuel cell activation apparatus disposed between a system power supply and a fuel cell, a fuel cell activation method, and a fuel cell activation system.

BACKGROUND ART

Conventionally, a self-sustained operation assisting device is disclosed which enables a self-sustained operation of a fuel cell used in cooperation with a system power supply under a power failure of the system power supply, and allows the fuel cell to adapt to sharp load fluctuation (see Patent Literature (PTL) 1).

CITATION LIST

Patent Literature

[PTL 1]
[Patent Literature 1] Japanese Unexamined Patent Application Publication No. 2008-22650

SUMMARY OF INVENTION

Technical Problem

However, a fuel cell operates normally in the presence of a system power supply, in other words, a supply source of electric power. For this reason, when a system power supply is not present, there is a possibility that the fuel cell cannot be activated. Thus, in order to stably activate a fuel cell even under a power failure, it is desirable to cause the fuel cell to recognize the presence of the source of electric power.

In view of the above, the present invention provides a fuel cell activation apparatus and the like which enable a fuel cell to activate even under a power failure of a system power supply.

Solution to Problem

A fuel cell activation apparatus according to an aspect of the present invention is a fuel cell activation apparatus disposed between a system power supply and a fuel cell, the fuel cell activation apparatus including: a storage battery; a first sensor which detects a current outputted by the storage battery; a first switch which switches between supplying the current outputted by the storage battery and supplying a current provided from the system power supply; a second switch which switches between transmitting a result of detection performed by the first sensor to the fuel cell and transmitting a result of detection performed by a second sensor which detects the current provided from the system power supply, to the fuel cell; and a control unit configured to control the first switch and the second switch and thereby performing switching between a normal mode for activating, based on the result of detection performed by the second sensor, the fuel cell using the current provided from the system power supply and a self-sustained mode for activating, based on the result of detection performed by the first sensor, the fuel cell using the current outputted by the storage battery.

General and specific aspects disclosed above may be implemented using a system, a method, an integrated circuit, a computer program, or a computer-readable recording medium such as a compact disc read only memory (CD-ROM), or any combination of systems, methods, integrated circuits, computer programs, or computer-readable recording media.

Advantageous Effects of Invention

A fuel cell activation apparatus according to the present invention is capable of activating a fuel cell even under a power failure of a system power supply.

Figure 1:
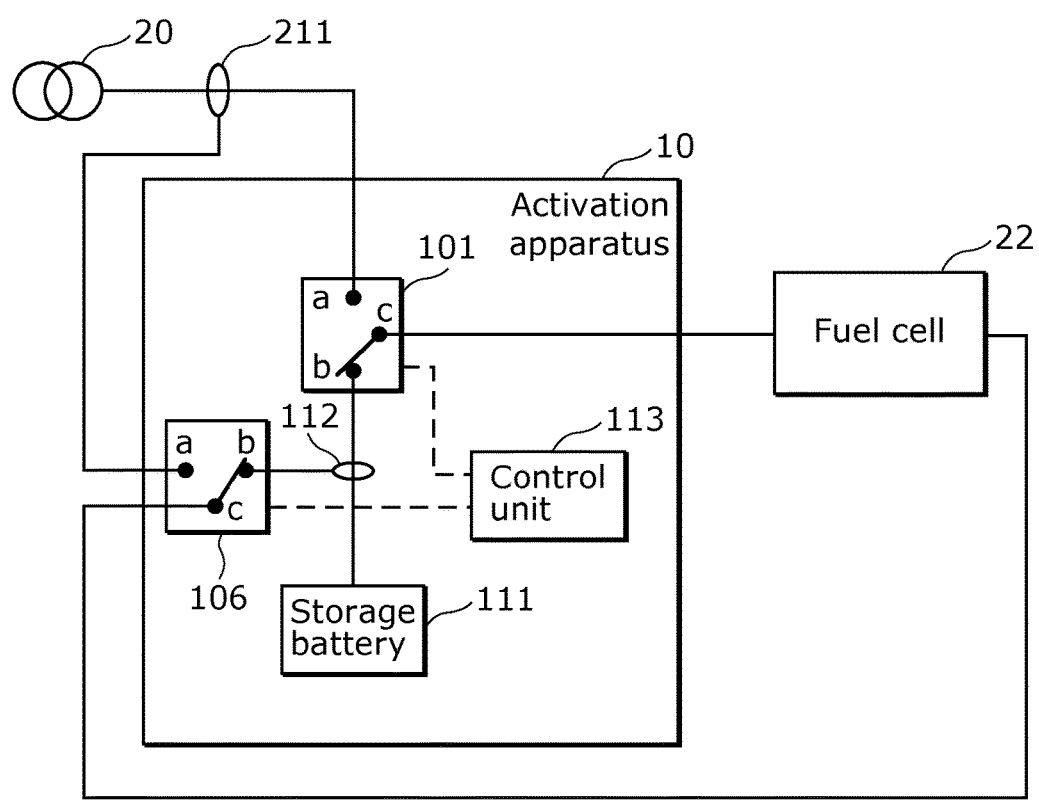
FIG. 1 is a block diagram which illustrates an activation apparatus and an activation system according to Embodiment 1.

DESCRIPTION OF EMBODIMENTS (Underlying Knowledge Forming Basis of the Present Disclosure)

In relation to the self-sustained operation assisting device for a fuel cell described in the Background section, the inventors have found the problem described below.

In recent years, a power supply system which supplies a customer with a combination of electric power from a system power supply and electric power supplied by a fuel cell installed for each customer. Since the electric power from the system power supply is AC power, the electric power supplied from the fuel cell is converted into AC power suitable to the phase of the electric power from the system power supply so that the electric power from the system power supply is combined with the electric power supplied from the fuel cell.

When the system power supply is put into a power failure state, control is performed such that electric power is not outputted from a customer to the system power supply (reverse power flow), for the purpose of safety at the side of the power distribution network of the system power supply. Conventionally, for this control, a current sensor is provided inside a distribution board, for detecting a direction and magnitude of a current of the system power supply. When the current sensor detects a current flowing from the customer toward the system power supply, the distribution board or a fuel cell performs control for switching of a switch and the like to prevent electric power from being outputted from the customer to the system power supply.

In addition, the fuel cell confirms that the above-described current sensor surely measures a current inputted into the fuel cell, thereby operating further properly. For example, the fuel cell increases or decreases internal impedance of the fuel cell, to determine whether or not the magnitude of a current detected by the current sensor changes according to the increase or decrease. In the determination, when the magnitude of a current detected by the current sensor changes according to the increase or decrease of the internal impedance of the fuel cell, it is determined that the above-described current sensor surely measures the electric power inputted into the fuel cell, By doing so, the fuel cell performs operation dependently on the current that is inputted thereto.

Conventionally, a self-sustained operation assisting device is disclosed which enables a fuel cell used in cooperation with a system power supply to perform a self-sustained operation under a power failure of the system power supply, and to adapt to sharp load fluctuation (see PTL 1).

However, with the self-sustained operation assisting device disclosed by PTL 1, there often is the case where a fuel cell cannot be activated under a power failure of the system power supply. More specifically, with the self-sustained operation assisting device disclosed by PTL 1, a current sensor for detecting a current inputted into the fuel cell is not taken into consideration, and thus the fuel cell, in some cases, cannot be activated depending on a current that is inputted into the fuel cell.

In view of the above, the present invention provides a fuel cell activation apparatus which activates a fuel cell even under a power failure of a system power supply.

In order to solve the above-described problem, a fuel cell activation apparatus (hereinafter also referred to simply as an activation apparatus) according to an aspect of the present invention is a fuel cell activation apparatus disposed between a system power supply and a fuel cell, the fuel cell activation apparatus including: a storage battery; a first sensor which detects a current outputted by the storage battery; a first switch which switches between supplying the current outputted by the storage battery and supplying a current provided from the system power supply; a second switch which switches between transmitting a result of detection performed by the first sensor to the fuel cell and transmitting a result of detection performed by a second sensor which detects the current provided from the system power supply, to the fuel cell; and a control unit configured to control the first switch and the second switch and thereby performing switching between a normal mode for activating, based on the result of detection performed by the second sensor, the fuel cell using the current provided from the system power supply and a self-sustained mode for activating, based on the result of detection performed by the first sensor, the fuel cell using the current outputted by the storage battery.

With this, the fuel cell activation apparatus is capable of activating the fuel cell in both cases where the system power supply is in the supply state and where the system power supply is in the power failure state. The fuel cell is activated using an input current when the characteristics of the input current are appropriate. In the state where electric power is supplied from the system power supply (supply state), the activation apparatus is capable of activating the fuel cell with use of the system power supply according to the normal mode. On the other hand, in the state where electric power is not supplied from the system power supply (power failure state), the activation apparatus is capable of activating (cold start) the fuel cell with use of the storage battery, according to the self-sustained mode. Thus, the activation apparatus is capable of activating the fuel cell even under a power failure of the system power supply.

On the other hand, according to the conventional techniques, there is the case where the fuel cell cannot be activated under a power failure of the system power supply. The reason for this is that the conventional activation apparatuses merely supply a current to a fuel cell with use of a storage battery, and are not provided with the function of notifying the fuel cell of the characteristics of the current. The activation apparatus according to an aspect of the present invention not only inputs a current to a fuel cell but also notifies the fuel cell of the characteristics of the current detected by a current sensor. With this, the activation apparatus is capable of activating the fuel cell even under a power failure of the system power supply.

The control unit may control switching of the first switch to cause the current outputted by the storage battery to be supplied to the fuel cell, and control switching of the second switch to cause the result of detection performed by the first sensor to be transmitted to the fuel cell, to thereby perform switching into the self-sustained mode.

With this, the activation apparatus controls switching of the first switch and the second switch, thereby enabling switching into the self-sustained mode.

For example, the control unit may control switching of the second switch to cause the result of detection performed by the first sensor to be transmitted to the fuel cell when the first switch is switched to cause the current outputted by the storage battery to be supplied to the fuel cell, to thereby perform switching into the self-sustained mode.

With this, the activation apparatus is capable of supplying an input current from the storage battery to the fuel cell, and then notifying the fuel cell of the characteristics of the input current, According to this, the activation apparatus notifies the fuel cell of the characteristics of a current while supplying the fuel cell with the current having a stabile current value, and thus it is possible to activate the fuel cell with enhanced stability. In addition, the activation apparatus is capable of simplifying control by causing the control of the second switch to link to the first switch.

For example, the first switch switches the current to be supplied to the fuel cell, by switching connection between the fuel cell and the storage battery and connection between the fuel cell and the system power supply, and the second switch switches the detection result to be transmitted to the fuel cell, by switching connection between the fuel cell and the first sensor and connection between the fuel cell and the second sensor which detects the current provided from the system power supply.

With this, the activation apparatus is capable of implementing switching of currents by changing the connections between the fuel cell, the storage battery, and the system power supply. In addition, the activation apparatus is capable of implementing switching of transmission of a result of detection performed by the sensor, by changing connections between the fuel cell, the first sensor, and the second sensor.

For example, the current outputted by the storage battery may be a direct current, the fuel cell activation apparatus may further include a DC/AC converter which converts the direct current outputted by the storage battery into an alternating current and outputs the alternating current generated by the converting, and the first sensor may detect the alternating current outputted by the DC/AC converter.

With this, the activation apparatus is capable of supplying the fuel cell with an alternating current generated with use of a direct current outputted from the storage battery.

For example, the fuel cell activation apparatus may further include a third switch disposed between the storage battery and the DC/AC converter, the third switch switching between causing and not causing the current outputted by the storage battery to be inputted into the DC/AC converter, wherein the control unit may, when the first switch is switched to cause the current outputted by the storage battery to be supplied to the fuel cell, control switching of the third switch to cause the current outputted by the storage battery to be inputted into the DC/AC converter.

With this, the activation apparatus is capable of reducing occurrence of wasteful power consumption in the DC/AC converter. Before the first switch is switched so that the current outputted by the storage battery is supplied to the fuel cell, there is no circuit which consumes the alternating current outputted from the DC/AC converter. In such a case, it is possible to prevent power consumption in the DC/AC converter by placing the third switch into a non-conductive state.

For example, the control unit may, when the first switch is switched to cause the current outputted by the storage battery to be supplied to the fuel cell, control the second switch to cause the result of the detection performed by the first sensor to be transmitted to the fuel cell, after controlling the switching of the third switch to cause the current outputted by the storage battery to be inputted into the DC/AC converter.

With this, the activation apparatus is capable of starting supplying of a current after a circuit for supplying the current from the storage battery to the fuel cell is established, and then notifying the fuel cell of the characteristics of the input current. With this, the activation apparatus is capable of activating the fuel cell with enhanced stability while reducing wasteful power consumption in the DC/AC converter. In addition, the activation apparatus is capable of simplifying control by causing the control of the second switch and the third switch to link to the first switch.

For example, the fuel cell activation apparatus may further include a first operation unit configured to receive an operation for the first switch by a user, and switch the first switch in accordance with the operation when the operation is received.

With this, the activation apparatus is capable of switching a source of current supply for the fuel cell from the system power supply to the storage battery, based on an explicit operation by a user. Assuming that the above-described switching is automatically performed when the system power supply is put into a power failure state, there is a possibility that the activation apparatus activates the fuel cell regardless of whether or not a user needs electric power. It is desirable not to activate a fuel cell when it is not necessary to activate the fuel cell for such a reason that a user is away from home, and so on. Thus, the activation apparatus is capable of activating the fuel cell when the user needs activation of the fuel cell.

For example, the control unit may switch the first switch to cause the fuel cell to be supplied with the current outputted by the storage battery when the second sensor detects that a current is not being supplied from the system power supply.

With this, the activation apparatus is capable of switching a source of current supply for the fuel cell from the system power supply to the storage battery, when the system power supply is in a power failure state. In other words, the activation apparatus is capable of activating the fuel cell regardless of whether or not a user needs electric power.

For example, the fuel cell activation apparatus may further include a first power line connecting the first switch with the DC/AC converter; and a second power line connected to the first power line, the second power line being for supplying a current to an external appliance outside the fuel cell activation apparatus.

With this, the activation apparatus is capable of supplying an external appliance via the second power line with the electric power outputted by the fuel cell.

For example, the DC/AC converter may output the alternating current via a power line of a single-phase two-wire system, the system power supply may supply the alternating current via a power line of a single-phase three-wire system, the fuel cell may input or output the alternating current via a power line of the single-phase three-wire system, the fuel cell activation apparatus may further include a transformer which is disposed on the first power line and bi-directionally transforms the alternating current flowing through the power line of the single-phase two-wire system and the alternating current flowing through the power line of the single-phase three-wire system, and the second power line may be connected to a zone on the first power line between the transformer and the DC/AC converter.

With this, the second power line of the activation apparatus is configured by a power line of the single-phase three-wire system, in order for the activation apparatus to supply electric power to an external appliance, there are methods of supplying from a power line of the single-phase two-wire system and supplying from a power line of the single-phase three-wire system. The activation apparatus is capable of supplying the external appliance with more stable electric power by supplying the external appliance with the electric power via the power line of the single-phase two-wire system.

For example, the DC/AC converter may output the alternating current via a power line of a single-phase two-wire system, the system power supply may supply the alternating current via a power line of a single-phase three-wire system, the fuel cell may input or output the alternating current via a power line of the single-phase three-wire system, the fuel cell activation apparatus may further include a transformer which is disposed on the first power line and bi-directionally transforms an alternating current flowing through the power line of the single-phase two-wire system and the alternating current flowing through the power line of the single-phase three-wire system, and the second power line may be connected to a zone on the first power line between the transformer and the first switch.

With this, the second power line of the activation apparatus is configured by a power line of the single-phase three-wire system. It is possible to reduce the electric power transformed by the transformer, by supplying electric power from the power line of the single-phase three-wire system of the activation apparatus to an external appliance, and thus the activation apparatus can be implemented with lower costs.

For example, the fuel cell activation apparatus may further include an outlet connected to the second power line, the outlet being for connecting the external appliance.

With this, the activation apparatus is capable of supplying an external appliance with electric power via an outlet same as that used in appliances in general.

For example, the fuel cell activation apparatus may be further connected to a hot water storage unit outside the fuel cell activation apparatus, and may further include a fourth switch which switches between supplying the current provided from the system power supply to the hot water storage unit and supplying a current flowing through the first power line to the hot water storage unit, and the control unit may control the fourth switch to cause the current flowing through the first power line to be supplied to the hot water storage unit when the first switch is switched to cause the current outputted by the storage battery to be supplied to the fuel cell.

With this, the activation apparatus is capable of supplying the hot water storage unit with electric power outputted by the fuel cell.

For example, the fuel cell activation apparatus may further include: an AC/DC converter which converts, into the direct current, the alternating current provided from the system power supply or flowing through the first power line, and outputs the direct current resulting from the converting to the storage battery; and a fifth switch which switches between causing and not causing the alternating current provided from the system power supply or flowing through the first power line to be inputted into the AC/DC converter, wherein the control unit may control switching of the fifth switch to cause the alternating current provided from the system power supply to be inputted into the AC/DC converter, when the first switch is switched to cause the alternating current provided from the system power supply to be supplied to the fuel cell, and control switching of the fifth switch to cause the alternating current flowing through the first power line not to be inputted into the AC/DC converter, when the first switch is switched to cause the current outputted by the storage battery to be supplied to the fuel cell.

With this, the activation apparatus is capable of charging the storage battery, via the AC/DC converter, with part of the electric power outputted by the fuel cell.

For example, the control unit may control switching of the fifth switch to cause the alternating current to be inputted into the AC/DC converter, when it is detected that the fuel cell is activated after the first switch is switched to cause the current outputted by the storage battery to be supplied to the fuel cell.

With this, the activation apparatus is capable of activating the fuel cell with use of electric power outputted by the storage battery, and after the activation, charging, via the AC/DC converter, the storage battery with part of the electric power resulting from superimposing the electric power outputted by the storage battery on the electric power outputted by the fuel cell.

For example, the fuel cell activation apparatus may be connected to a distribution board to which electric power provided from the system power supply is supplied.

With this, the activation apparatus is supplied with electric power from the system power supply via the distribution board.

For example, the storage battery may be a battery pack used in a power-assisted bicycle.

With this, even when the storage battery comes to the end of the product's life, the activation apparatus is capable of activating the fuel cell with use of, instead of the storage battery, a battery pack that is used in a power-assisted bicycle.

For example, the first sensor may be disposed on the first power line without a device which consumes a current being disposed between the first sensor and the DC/AC converter.

With this, the activation apparatus is capable of more properly detecting, using a current sensor, the direction or magnitude of an alternating current outputted by the DC/AC converter.

For example, the fuel cell activation apparatus may further include a first light source disposed near the first operation unit, wherein the control unit may further cause the first light source to turn on when the second sensor detects that a current is not being supplied from the system power supply.

With this, when the system power supply is in a power failure state, the first light source is capable of illuminating the first operation unit so that a user can easily operate the first operation unit.

For example, the fuel cell activation apparatus may further include a sixth switch disposed on the second power line, the sixth switch switching between causing and not causing a current flowing through the first power line to be supplied to the outlet; and a second operation unit may receive a user's operation for the sixth switch, wherein the control unit may control switching of the sixth switch based on the user's operation received by the second operation unit.

With this, it is possible to switch, based on an operation by a user, whether or not to supply electric power to an external appliance connected to the outlet.

For example, the fuel cell activation apparatus may further include a second light source, wherein the control unit may further cause the second light source to turn on when controlling the switching of the sixth switch to cause the current flowing through the first power line to be supplied to the outlet.

With this, it is possible to allow a user to visually check whether or not it is possible to supply electric power to the external appliance connected to the outlet.

For example, the first sensor may detect at least one of a direction and a magnitude of the current outputted by the storage battery, and the second sensor may detect at least one of the direction and the magnitude of the current provided from the system power supply.

With this, the first sensor or the second sensor is capable of detecting the characteristics of a current.

In addition, a fuel cell activation method according to an aspect of the present invention is a fuel cell activation method performed by a fuel cell activation apparatus disposed between a system power supply and a fuel cell, the fuel cell activation apparatus including: a storage battery; a first sensor which detects a current outputted by the storage battery; a first switch which switches between supplying the current outputted by the storage battery and a current provided from the system power supply; and a second switch which switches between transmitting, to the fuel cell, a result of detection performed by the first sensor and transmitting, to the fuel cell, a result of detection performed by a second sensor which detects the current provided from the system power supply, the fuel cell activation method including: detecting a current by the first sensor or the second sensor; and controlling the first switch and the second switch and thereby switching between (i) a normal mode for activating, using the current provided from the system power supply, the fuel cell based on the result of detection performed by the second sensor, and (ii) a self-sustained mode for activating, using the current outputted by the storage battery, the fuel cell based on the result of detection performed by the first sensor.

With this, the advantageous effects same as those described above are produced.

In addition, a fuel cell activation system according to an aspect of the present invention includes the fuel cell activation apparatus described above, and the fuel cell which is activated by the fuel cell activation apparatus.

With this, the advantageous effects same as those described above are produced.

In addition, a fuel cell according to an aspect of the present invention is a fuel cell which is activated by the fuel cell activation apparatus described above.

With this, the advantageous effects same as those described above are produced.

In addition, a fuel cell activation apparatus according to an aspect of the present invention is a fuel cell activation apparatus used for a fuel cell which is activated using a current supplied from outside and information about the current, the fuel cell activation apparatus including: a storage battery; a first current path for electrically connecting the fuel cell with a power grid; a second current path for electrically connecting the storage battery with the fuel cell; a first sensor which detects a current discharged from the storage battery, and transmits a result of the detection to the fuel cell; and a controller that executes, when a current is not supplied from the power grid, a self-sustained mode in which the fuel cell is activated by providing a current to the fuel cell by discharging the storage battery, and notifying the fuel cell of the current information detected by the first sensor.

For example, the controller may execute a normal mode in which the fuel cell is activated by supplying the fuel cell with a current supplied from the power grid and notifying the fuel cell of a information detected by a second sensor which detects the current supplied from the power grid.

For example, the fuel cell may be activated using a current supplied from outside and sensor information related to at least one of a direction and a magnitude of the current, the first sensor may detect at least one of the direction and the magnitude of a current supplied from the storage battery, and the controller may execute the self-sustained mode by notifying the fuel cell of at least one of the direction and the magnitude of a current detected by the first sensor.

For example, the fuel cell activation apparatus further includes: a first switch which switches each of the first current path and the second current path between a conductive state and a non-conductive state; and a second switch which switches between the first sensor and the second sensor as a source of the sensor information to be transmitted to the fuel cell, wherein the controller may perform switching between the normal mode and the self-sustained mode by controlling switching of the first switch and the second switch.

For example, the fuel cell activation apparatus further includes: a first operation unit which receives a user's operation for performing the switching between the normal mode and the self-sustained mode, and when the user's operation is received, switches the first switch and the second switch in accordance with the user's operation for performing the switching between the normal mode and the self-sustained mode.

These general and specific aspects may be implemented using a system, a method, an integrated circuit, a computer program, or a computer-readable recording medium such as a CD-ROM, or any combination of systems, methods, integrated circuits, computer programs, or computer-readable recording media.

Hereinafter, certain exemplary embodiments are described in greater detail with reference to the accompanying Drawings.

It is to be noted that the exemplary embodiment described below shows a general or specific example. The numerical values, shapes, materials, structural elements, the arrangement and connection of the structural elements, steps, the processing order of the steps, and so on, shown in the following embodiment are mere examples, and therefore do not limit the present invention. In addition, among the structural elements in the following embodiments, structural elements not recited in any one of the independent claims are described as arbitrary structural elements.

(Embodiment 1)

In this exemplary embodiment, a fuel cell activation apparatus which activates, by using a current sensor, a storage battery, and a switch, a fuel cell even under a power failure of a system power supply will be described.

FIG. 1 is an example of a block diagram of an activation apparatus and an activation system according to this exemplary embodiment.

As illustrated in FIG. 1, an activation apparatus 10 according to this exemplary embodiment is connected to each of a system power supply 20 and a fuel cell 22. In addition, a current sensor 211 is provided on a power line connecting the activation apparatus 10 and the system power supply 20. In the state where electric power is supplied from the system power supply 20 (supply state), the activation apparatus 10 supplies the fuel cell 22 with the electric power supplied from the system power supply 20, In addition, the current sensor 211 detects the direction or the magnitude of a current flowing through the power line on which the current sensor 211 is provided, and notifies the fuel cell 22 of a result of the detection. The fuel cell 22 is activated using an inputted current when the direction or the magnitude of a current detected by the current sensor 211 is appropriate, superposes, on the inputted current, a current having the same phase as the phase of the inputted current, and outputs the resultant current.

On the other hand, in the state where electric power is not supplied from the system power supply 20 (power failure state), the activation apparatus 10 supplies the fuel cell 22 with a current for activating the fuel cell 22, and at the same time notifies the fuel cell 22 with an appropriate direction or magnitude of a current for activating the fuel cell 22.

The following will describe in detail an internal configuration of the activation apparatus 10.

As illustrated in FIG. 1, the activation apparatus 10 according to this exemplary embodiment includes: a storage battery 111; a current sensor 112; a switch 101; a switch 106; and a control unit 113.

The storage battery 111 charges or discharges electric power.

The current sensor 112 detects a current outputted by a storage battery 111.

The switch 101 switches the current to be supplied to the fuel cell 22 between the current outputted from the storage battery 111 and the current provided from the system power supply 20. It is to be noted that the switch 101, in other words, switches between (i) supplying a current outputted by the storage battery 111 to the fuel cell 22 and (ii) supplying a current provided from the system power supply 20 to the fuel cell 22.

The switch 106 switches a detection result to be transmitted to the fuel cell 22 between a detection result of the current sensor 112 and a detection result of the current sensor 211 which detects a current provided from the system power supply 20. It is to be noted that the switch 106, in other words, switches between transmitting to the fuel cell 22 a detection result of the current sensor 112 and transmitting to the fuel cell 22 a detection result of the current sensor 211 which detects a current provided from the system power supply 20.

The control unit 113 controls the switch 101 and the switch 106, thereby switching between a normal mode in which the fuel cell 22 is activated using a current provided from the system power supply 20 based on the detection result of the current sensor 211 and a self-sustained mode in which the fuel cell 22 is activated using a current outputted by the storage battery 111 based on the detection result of the current sensor 112.

As described above, with the activation apparatus according to this exemplary embodiment, the fuel cell activation apparatus is capable of activating a fuel cell in both cases where the system power supply is in the supply state and where the system power supply is in the power failure state. The fuel cell is activated using an input current when the characteristics of the input current are appropriate. In the state where electric power is supplied from the system power supply (supply state), the activation apparatus is capable of activating a fuel cell with use of the system power supply in the normal mode. On the other hand, in the state where electric power is not supplied from the system power supply (power failure state), the activation apparatus is capable of activating (cold start) a fuel cell with use of the storage battery in the self-sustained mode. Thus, the activation apparatus is capable of activating the fuel cell even under a power failure of a system power supply.

On the other hand, according to the conventional techniques, there is the case where the fuel cell cannot be activated under a power failure of the system power supply. The reason for this is that the conventional activation apparatuses merely supply a current to a fuel cell with use of a storage battery, and are not provided with the function of notifying the fuel cell of the characteristics of the current. The activation apparatus according to an aspect of the present invention not only inputs a current to a fuel cell but also notifies the fuel cell of the characteristics of the current which are detected by a current sensor. With this, the activation apparatus is capable of activating the fuel cell even under a power failure of a system power supply.

(Embodiment 2)

In this exemplary embodiment, an example of the configuration of the activation apparatus will be described in more detail. It is to be noted that the constituent elements same as those in Embodiment 1 will be assigned with the same reference numerals as those in Embodiment 1, and description for them will be omitted in some cases.

Figure 2:
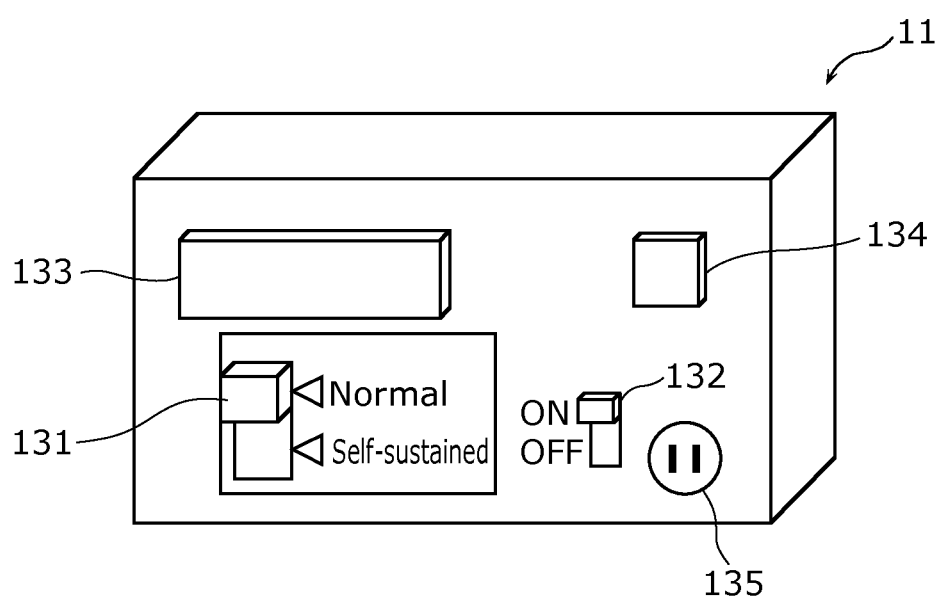
FIG. 2 is an external view of an activation apparatus according to Embodiment 2.

FIG. 2 is an external view of an activation apparatus 11 according to this exemplary embodiment.

As illustrated in FIG. 2, the activation apparatus 11 according to this exemplary embodiment includes: a switch 131, a switch 132, a light source 133, a light source 134, and an outlet 135.

The switch 131 is a switch for switching an operation mode of the activation apparatus 11 between the normal mode and the self-sustained mode. The switch 131 is operated by a user. It is to be noted that the switch 131 corresponds to a first operation unit.

The switch 132 is a switch for switching between outputting and not outputting electric power to the outside via the outlet 135 by the activation apparatus 11. The switch 132 is operated by a user. It is to be noted that the switch 132 corresponds to a second operation unit.

The light source 133 is a light source for illuminating neighborhood of the switch 131 and disposed at a position where the neighborhood of the switch 131 can be illuminated. The light source 133 is turned on when the system power supply 20 is in the power failure state. The light source 133 illuminates the neighborhood of the switch 133, thereby facilitating the operation for the switch 131 by the user.

The light source 134 is a light source for indicating whether or not electric power can be supplied to the outside via the outlet 135, The light source 134 is turned on when the outlet 135 can supply electric power.

The outlet 135 is a connecting port for connecting an external appliance. The external appliance connected to the outlet 135 is provided with electric power from the activation apparatus 11 via the outlet 135.

Figure 3:
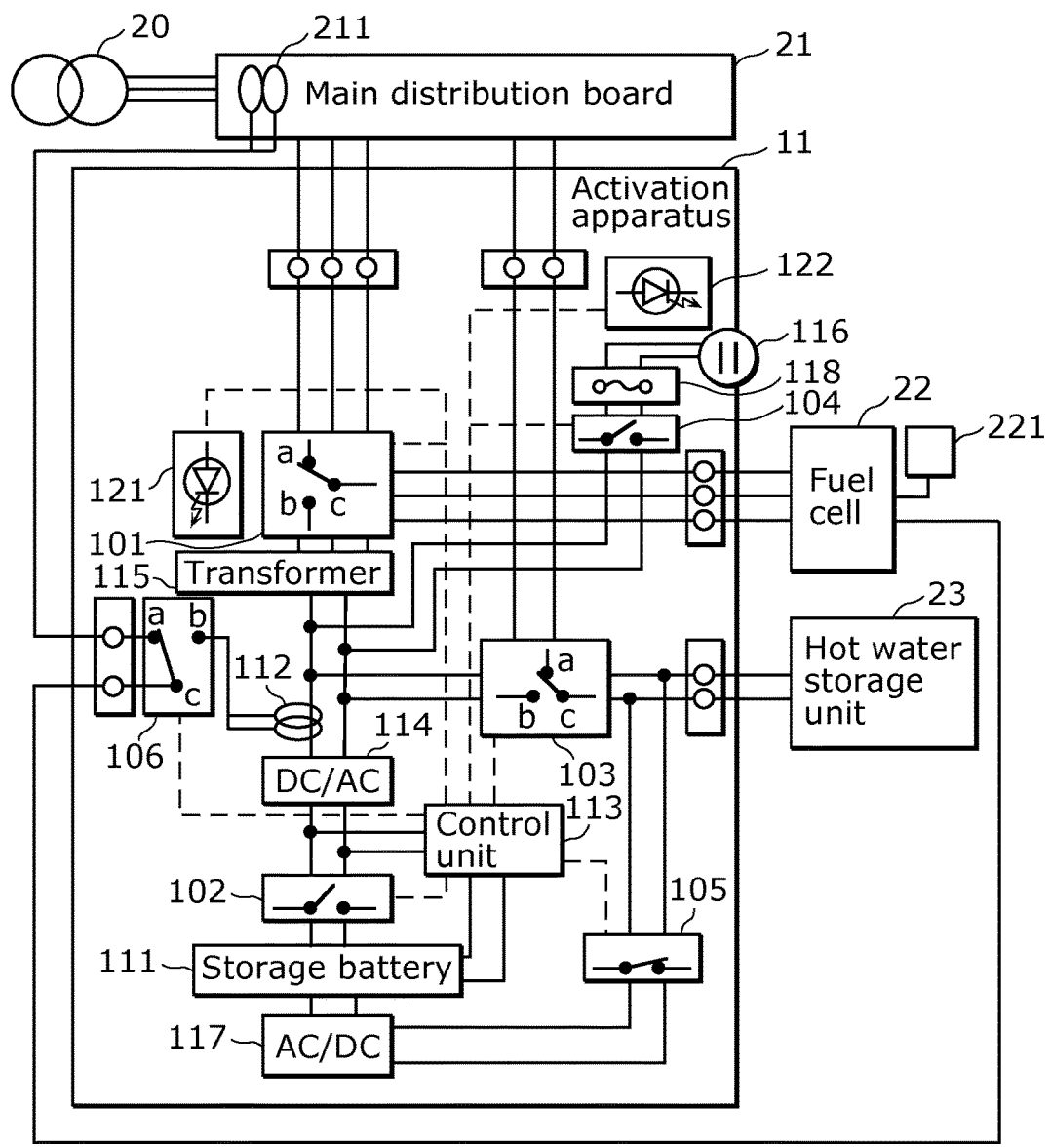
FIG. 3 is a first example of a block diagram of the activation apparatus according to Embodiment 2.

FIG. 3 is a first example of a block diagram of the activation apparatus 11 according to this exemplary embodiment.

The activation apparatus 11 illustrated in FIG. 3 shows a more detailed structure than the activation apparatus 10 illustrated in FIG. 2.

As illustrated in FIG. 3, the activation apparatus 11 according to this exemplary embodiment includes: the six switches 101 to 106; the storage battery 111; the current sensor 112; the control unit 113; a DC/AC converter 114; a transformer 115; an outlet 116; an AC/DC converter 117; a fuse 118; a light source 121; and a light source 122. In addition, a main distribution board 21, the fuel cell 22, and a hot water storage unit 23 are connected to the activation apparatus 11 The system power supply 20 is connected to the main distribution board.

The storage battery 111 charges or discharges electric power. It is to be noted that, for example, a battery pack used for appliances such as a power-assisted bicycle may be employed as the storage battery 111. In this case, it is possible to cause the system continuously to operate by replacing the battery pack even when the storage battery 111 comes to the end of the product's life.

The current sensor 112 detects the direction or magnitude of an Alternating current outputted from the DC/AC converter 114. It is to be noted that, by not connecting a device which consumes a current (this includes a power line connected to a device which consumes a current, and the same shall apply hereafter) between the current sensor 112 and the DC/AC converter 114, the current sensor 112 can more accurately detect the direction or magnitude of an Alternating current outputted from the DC/AC converter. This is because, when connecting a device which consumes a current between the current sensor 112 and the DC/AC converter 114, a current detected by the current sensor 112 is a current resulting from subtracting a current consumed by the device from the current outputted by the DC/AC converter 114. It is to be noted that the current sensor 112 corresponds to the first sensor.

The control unit 113 controls switching of each of the switches 101 to 106. In addition, the control unit 113 controls turning on or turning off of each of the light source 121 and the light source 122.

The DC/AC converter 114 converts a direct current outputted by the discharging of the storage battery 111 into an alternating current, and outputs, to the power line of a single-phase two-wire system, the alternating current generated by the converting.

The transformer 115 converts the alternating current of the single-phase two-wire system outputted by the DC/AC converter 114, into an alternating current of a single-phase three-wire system. It is to be noted that the transformer 115 is disposed on the first power line that is a power line connecting the switch 101 and the DC/AC converter 114.

The outlet 116 is a connecting port for connecting an external appliance. The outlet 116 outputs the current flowing between the transformer 115 on the first power line and the DC/AC converter 114 to an external appliance connected to the outlet 116. The outlet 116 corresponds to the outlet 135 illustrated in FIG. 2. It is to be noted that the power line connecting the first power line and the outlet 116 corresponds to a second power line.

The fuse 118 is disposed on the second power line, and when a current larger than a predetermined magnitude passes through the second power line, the fuse 118 is blown to interrupt the current. It is to be noted that the fuse 118 may have any configuration as long as the fuse 118, when a current larger than a predetermined value passes through the second power line, has a function of interrupting the current. The fuse 118 may be replaced with a breaker, for example.

The light source 121 is turned on or off under the control of the control unit 113. The light source 121 corresponds to the light source 133 illustrated in FIG. 2.

The light source 122 is turned on or off under the control of the control unit 113. The light source 121 corresponds to the light source 134 illustrated in FIG. 2. It is to be noted that, although the light source 121 and the light source 122 are each illustrated using a sign of a light emitting diode (LED) as an example in FIG. 3, the light source may be of any type. To be specific, each of the light source 121 and the light source 122 may be an incandescent lamp, a fluorescent lamp, or the like.

The switch 101 includes three terminals a, b, and c. The terminal a is connected to the main distribution board, the terminal b is connected to the transformer, and the terminal c is connected to the fuel cell 22. The switch 101 is controlled by the control unit 113, and switches between supplying the fuel cell 22 with a current outputted by the storage battery 111 (conduction between the terminal a and the terminal c) and supplying the fuel cell 22 with a current provided from the system power supply 20 (conduction between the terminal b and the terminal c). It is to be noted that the switch 101 corresponds to the first switch.

The switch 102 includes two terminals, one of which is connected to the storage battery 111 and the other is connected to the DC/AC converter 114. The switch 102 is controlled by the control unit 113 and switches between ON (conductive) to allow the current outputted by the storage battery 111 to be inputted into the DC/AC convert 114 and OFF (non-conductive) to prevent the current outputted by the storage battery 111 from being inputted into the DC/AC convert 114, It is to be noted that the switch 102 also has a function of reducing wasteful power consumption in the DC/AC converter 114. More specifically, the DC/AC converter 114 consumes predetermined electric power even when the destination of the DC/AC converter 114 does not include a circuit which consumes an alternating current outputted from the DC/AC converter 114, In such case, by turning the switch 102 OFF, it is possible to prevent predetermined electric power consumption in the DC/AC converter 114. It is to be noted that, in the case where the DC/AC converter 114 has a function of cutting predetermined electric power consumption when the destination of the DC/AC converter 114 does not includes a circuit, it is not necessary to include the switch 102. It is to be noted that the switch 102 corresponds to the third switch.

The switch 103 includes three terminals a, b, and c. The terminal a is connected to the main distribution board, the terminal b is connected to the first power line, and the terminal c is connected to the hot water storage unit 23, The switch 103 is controlled by the control unit 113, and switches between supplying the hot water storage unit 23 with a current outputted from the system power supply 20 (conduction between the terminal a and the terminal c) and supplying the hot water storage unit 23 with a current flowing through the first power line (conduction between the terminal b and the terminal c). It is to be noted that the switch 103 corresponds to the fourth switch.

The switch 104 includes two terminals, one of which is connected to the first power line and the other is connected to the fuse 118. The switch 104 is controlled by the control unit 113, and switches between (i) supplying, via the fuse 118, the outlet 116 with a current flowing through the first power line by being turned ON, and (ii) not supplying, the outlet 116 with a current flowing through the first power line by being turned OFF. It is to be noted that the switch 104 corresponds to the sixth switch.

The switch 105 includes two terminals, one of which is connected to the power line connecting the switch 103 and the hot water storage unit 23, and the other is connected to the AC/DC converter 117, The switch 105 is controlled by the control unit 113, and switches between (i) supplying a current supplied from the switch 103 to the hot water storage unit 23 to also the AC/DC converter 117 by being turned ON, and (ii) not supplying the current to the AC/DC converter 117 by being turned OFF. It is to be noted that the switch 105 corresponds to the fifth switch.

The switch 106 includes three terminals a, b, and c. The terminal a is connected to the current sensor 211, the terminal b is connected to the current sensor 112, and the terminal c is connected to the fuel cell 22. The switch 106 is controlled by the control unit 113, and switches between a detection result of the current sensor 211 and a detection result of the current sensor 112 as a detection result to be transmitted to the fuel cell 22. It is to be noted that the switch 106 corresponds to the second switch.

It is to be noted that each of the switches 101 to 106 may be implemented by other constituent elements having the function of the above-described switching. For example, the switch including three terminals may be implemented by a combination of switches each having two terminals.

The main distribution board 21 distributes electric power provided from the system power supply to a plurality of power lines, it is to be noted that the illustration of an internal configuration of the main distribution board 21 is omitted in the diagrams.

The fuel cell 22 is a device which generates electric power using, as a fuel, hydrogen derived from a gas and the like supplied to a customer, and outputs the generated electric power outside. In this exemplary embodiment, the case where hydrogen which is the fuel is derived from a gas is described as an example. A current generated by power generation is superposed on an inputted current and outputted, by the fuel cell 22. When the characteristics of electric power inputted from outside are appropriate, the fuel cell 22 is activated using the electric power. The processes at the time of activating the fuel cell 22 will be described later in detail. Although the fuel cell 22 can be activated by fuel supply and electric power input as described above, the fuel cell 22 generates power, in general, in the daytime that is a period of time in which an electric power company supplies system power at a relatively high cost. In this case, the fuel cell 22 is controlled by a control program in the fuel cell 22 so that the fuel cell 22 is activated at a predetermined time before a time at which power generation is started, and is put into an operation state after the activation processing with supply of a fuel and electric power.

In addition, the fuel cell 22 is provided with an operation board 221. The operation board 221 receives an operation for the fuel cell 22 by a user.

The hot water storage unit 23 is a device which generates hot water (water relatively at a high temperature) from water (water relatively at a low temperature), and stores the generated hot water. The hot water storage unit 23 generates hot water from water using electric power or heat generated when the fuel cell 22 generates electric power. The hot water storage unit 23 is provided generally by a provider as a set with the fuel cell 22.

The following describes switch connection at a time when the system power supply 20 is in the supply state and at a time when the system power supply 20 is in the power failure state. FIG. 3 illustrates switch connection at a time when the system power supply 20 is in the supply state.

As illustrated in FIG. 3, the switch 101, in which the terminal a and the terminal c are connected, allows electric power from the system power supply 20 to be supplied to the fuel cell.

The switch 102 is in the OFF state, and prevents a current outputted by the storage battery 111 from being inputted into the DC/AC converter 114.

The switch 103, in which the terminal a and the terminal c are connected, allows electric power from the system power supply 20 to be supplied to the hot water storage unit 23.

The switch 104 is in the OFF state, and prevents a current flowing through the first power line from being supplied to the outlet 116 via the fuse 118.

The switch 105 is in the ON state, and allows a current supplied to the hot water storage unit 23 to be also supplied to the AC/DC converter 117.

The switch 106, in which the terminal a and the terminal c are connected, allows a detection result of the current sensor 211 to be transmitted to the fuel cell 22.

In this state, the activation apparatus 11 supplies a current provided from the system power supply 20, to the fuel cell 22 via the switch 101. In addition, the activation apparatus 11 transmits a result of detecting a current provided from the system power supply 20 performed by the current sensor 211, to the fuel cell 22 via the switch 106. The activation apparatus 11 activates the fuel cell 22 using a current provided from the system power supply 20, when the current sensor 211 detects an appropriate current. In addition, the activation apparatus 11 supplies, via the switch 103 and the switch 105, the storage battery 111 with the current provided from the system power supply 20, thereby charging the storage battery 111.

Figure 4:
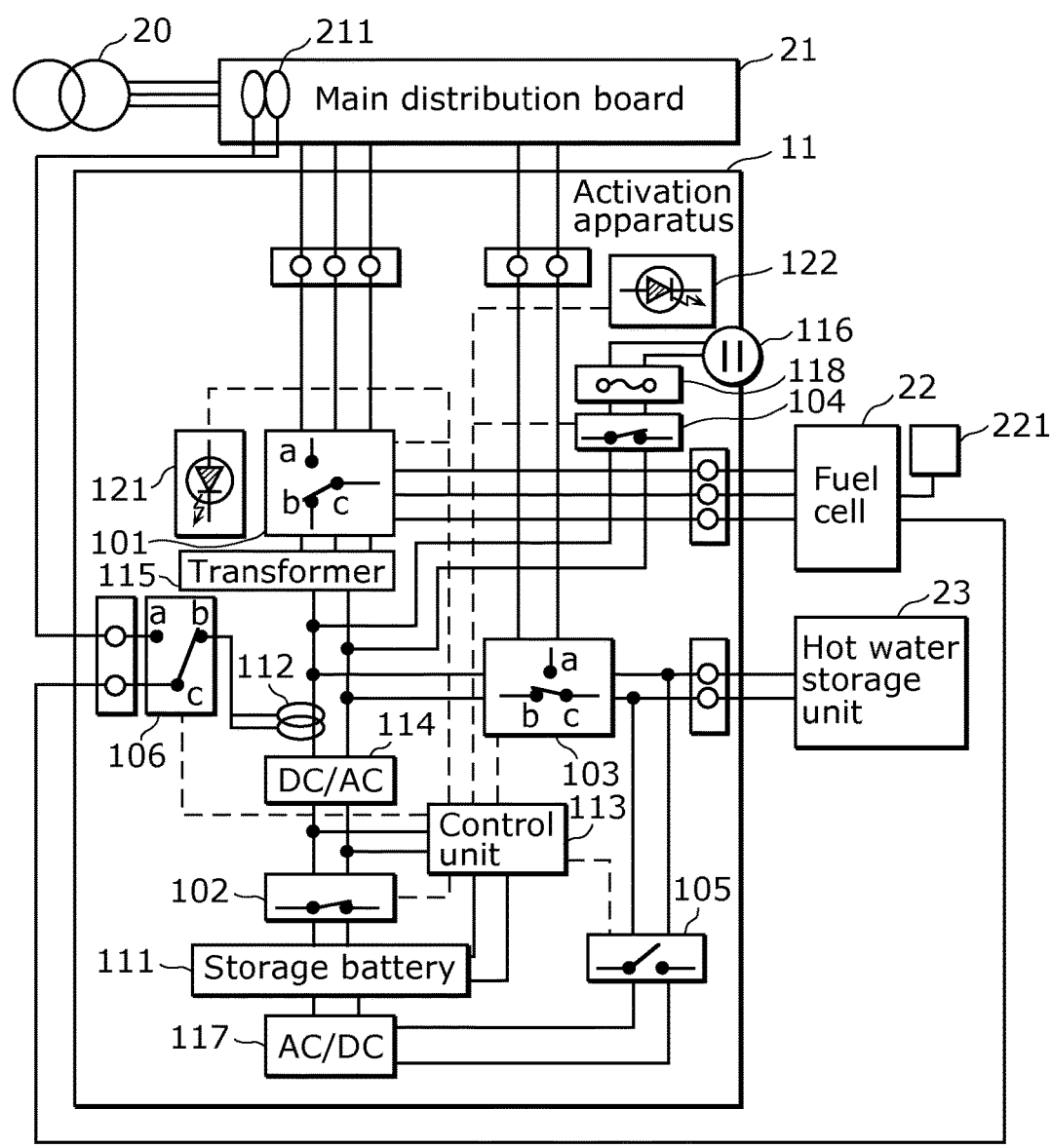
FIG. 4 is a second example of the block diagram of the activation apparatus according to Embodiment 2.

FIG. 4 is a second example of a block diagram of the activation apparatus 11 according to this exemplary embodiment. FIG. 4 illustrates switch connection at a time when the system power supply 20 is in the power failure state. It is to be noted that line connections between each of the constituent elements are the same as those illustrated in FIG. 3.

As illustrated in FIG. 4, the switch 101, in which the terminal b and the terminal c are connected, allows electric power from the storage battery 111 to be supplied to the fuel cell 22.

The switch 102 is in the ON state, and allows a current outputted by the storage battery 111 to be inputted into the DC/AC converter 114.

The switch 103, in which the terminal b and the terminal c are connected, allows a current from the storage battery 111 to be supplied to the hot water storage unit 23.

The switch 104 is in the ON state, and allows a current flowing through the first power line to be supplied to the outlet 116 via the fuse 118.

The switch 105 is in the OFF state, and prevents a current supplied from the switch 103 to the hot water storage unit 23 from being supplied to the AC/DC converter 117.

The switch 106, in which the terminal b and the terminal c are connected, allows a detection result of the current sensor 211 to be transmitted to the fuel cell 22.

In this state, the activation apparatus 11 supplies a current from the system power supply 11 to the fuel cell 22 via the switch 101. In addition, the activation apparatus transmits the result of detecting a current from storage battery 111 performed by the current sensor 112, to the fuel cell 22 via the switch 106. The activation apparatus 11 activates the fuel cell 22 using a current supplied from the storage battery 111 when the current sensor 112 detects an appropriate current.

Figure 5:
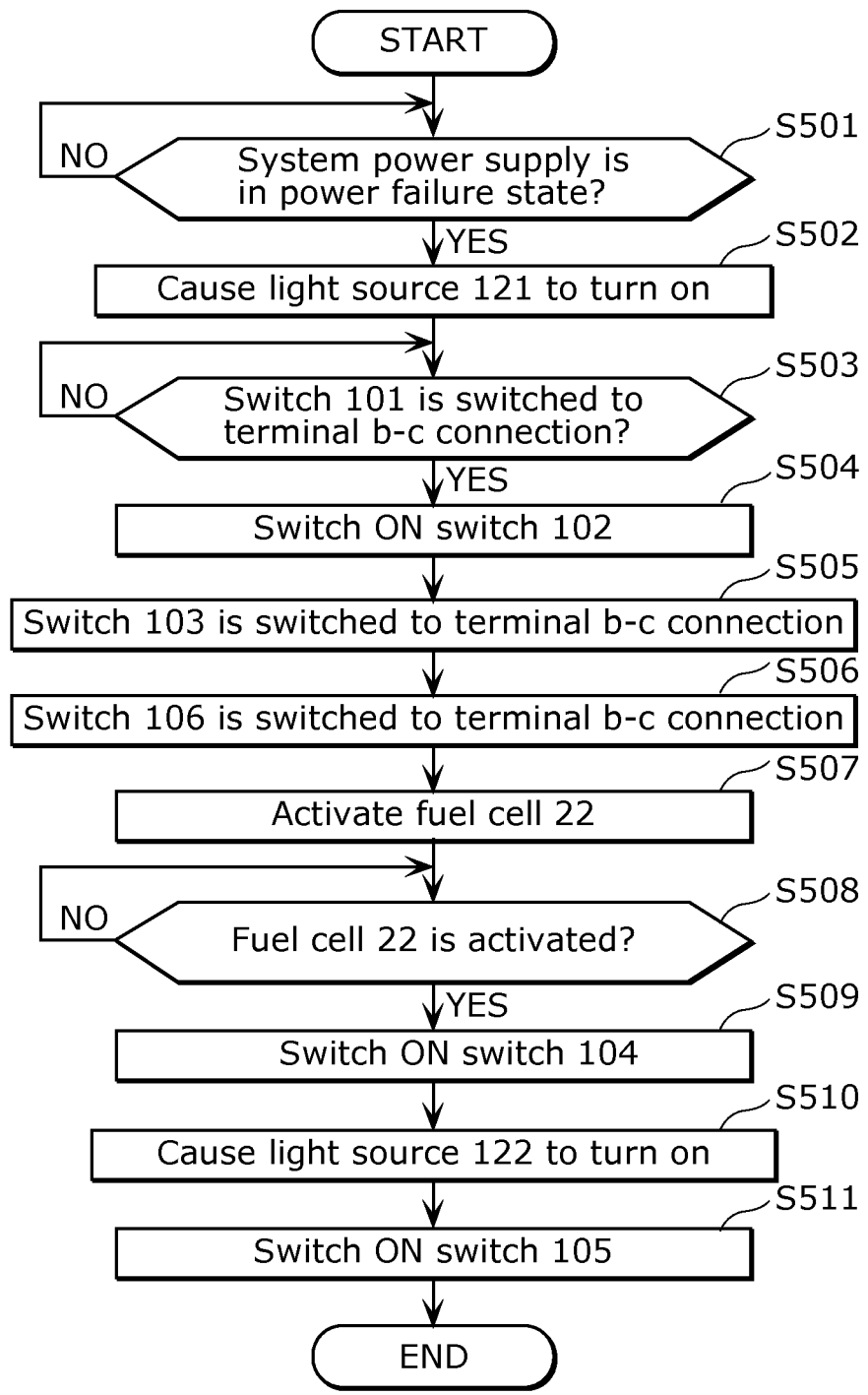
FIG. 5 is a flowchart of switching control of a switch of the activation apparatus according to Embodiment 2.

FIG. 5 is a flowchart of switching control of a switch of the activation apparatus 11 according to this exemplary embodiment.

First, in Step S501, the activation apparatus 11 determines whether or not the system power supply is in the power failure state. More specifically, the activation apparatus 11 determines that the system power supply is in the power failure state when the current sensor 211 does not detect a current. When the current sensor 211 does not detect a current (YES in Step S501), the process proceeds to Step S502. In contrast, when the current sensor 211 detects a current (NO in Step S501), the process of Step S501 is performed once again, in other words, the activation apparatus 11 stays in a wait state in Step S501 until the system power supply is put into the power failure state.

In Step S502, the control unit 113 causes the light source 121 to turn on.

In Step S503, the control unit 113 determines whether or not the terminal b and the terminal c in the switch 101 are connected (this state is also referred to as "terminal b-c connection"), When the terminal b and the terminal c are connected (YES in Step S503), the process proceeds to Step S504, In contrast, when the terminal b and the terminal c are not connected (NO in Step S503), the process of Step S503 is performed once again. In other words, the control unit 113 stays in a wait state in Step S503 until the terminal b and the terminal c are connected.

In Step S504, the control unit 113 switches ON the switch 102.

In Step S505, the control unit 113 switches the switch 103 so that the terminal b and the terminal c of the switch 103 are connected.

In Step S506, the control unit 113 switches the switch 103 so that the terminal b and the terminal c of the switch 106 are connected. It is to be noted that the order of the processes of Steps S504, S505, and S506 is not necessarily the above-described order, in other words, other order may be applied as long as the processes of Steps S504, S505, and S506 are executed subsequent to Step S503.

In Step S507, the control unit 113 activates the fuel cell 22. The processing of activating the fuel cell 22 will be described later in detail.

In Step S508, the control unit 113 determines whether or not the fuel cell 22 is activated. When it is determined that the fuel cell 22 is activated, the process proceeds to Step S509. In contrast, when it is not determined that the fuel cell 22 is activated, the process of Step S508 is executed once again. In other words, the control unit 113 stays in a wait state in Step S508 until the fuel cell 22 is activated.

In Step S509, the control unit 113 switches ON the switch 104.

In Step S510, the control unit 113 causes the light source 122 to turn on.

In Step S511, the control unit 113 switches ON the switch 105, It is to be noted that the order of the processes of Steps S509, S510, and S511 is not necessarily the above-described order. In other words, other order may be applied as long as the processes of Steps S509, S510, and S511 are executed subsequent to Step S508.

The switching control of a switch of the activation apparatus 11 is complete with the processes described above. With the above-described processes, the activation apparatus 11 supplies electric power to an external appliance via the outlet 116, supplies a generated current to the hot water storage unit, and further supplies a generated current to the storage battery 111 to charge the storage battery 111.

Figure 6:
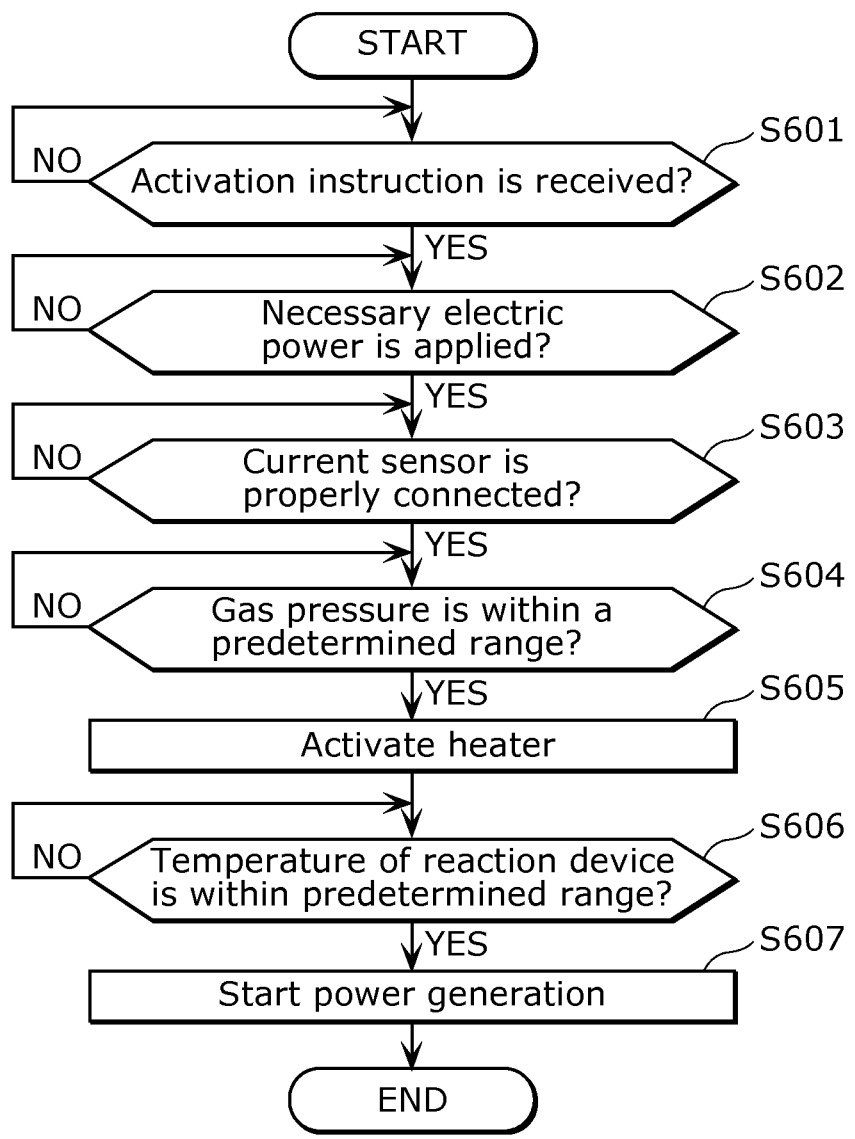
FIG. 6 is a flowchart of activation processing for a fuel cell according to Embodiment 2.

FIG. 6 is a flowchart of activation processing for the fuel cell 22 according to this exemplary embodiment.

First, in Step S601, the fuel cell 22 determines whether or not an activation instruction is received. When it is determined that the activation instruction is received (YES in Step S601), the process proceeds to Step S602. In contrast, when it is determined that the activation instruction is not received (NO in Step S601), the process of Step S601 is executed once again, in other words, the activation apparatus 22 stays in a wait state in Step S601 until the activation instruction is received.

In Step S602, the fuel cell 22 determines whether or not necessary electric power is applied. When it is determined that the necessary electric power is applied (YES in Step S602), the process proceeds to Step S603. In contrast, when it is determined that the necessary electric power is not applied (NO in Step S602), the process of Step S602 is executed once again. In other words, the fuel cell 22 stays in a wait state in Step S602 until the necessary electric power is applied.

In Step S603, the fuel cell 22 determines whether or not the current sensor is properly connected. When the fuel cell 22 determines that the current sensor is properly connected, the process proceeds to Step S604. In contrast, when the fuel cell 22 determines that the current sensor is not properly connected, the process of Step S603 is performed once again. In other words, the fuel cell 22 stays in a wait state in Step S603 until the current sensor is properly connected.

In Step S604, the fuel cell 22 determines whether or not a gas pressure is within a predetermined range. When the fuel cell 22 determines a gas pressure is within a predetermined range, the process proceeds to Step S605, In contrast, when the gas pressure is outside the predetermined range, the process of Step S604 is performed once again in other words, the fuel cell 22 stays in a wait state in Step S604 until the gas pressure falls within the predetermined range.

In Step S605, the fuel cell 22 activates a heater. The heater increases, using electric power, temperature of a reaction device in the fuel cell 22.

In Step S606, the fuel cell 22 determines whether or not the temperature of the reaction device is within a predetermined range. When the fuel cell 22 determines the temperature of the reaction device is within a predetermined range, the process proceeds to Step S607. In contrast, when the temperature of the reaction device is outside the predetermined range, the process of Step S606 is performed once again. In other words, the fuel cell 22 stays in a wait state in Step S606 until the temperature of the reaction device falls within the predetermined range.

In Step S607, the fuel cell 22 starts power generation and outputs electric power generated by the power generation to the outside.

The processing of activating the fuel cell 22 is complete with the processes described above. With the above-described processes, the fuel cell 22 is put into the operation state in which the electric power generated by the power generation is superimposed on the inputted current and outputted.

As described above, with the activation apparatus 11 according to an aspect of the present invention, the activation apparatus controls switching of the first switch and the second switch, thereby enabling switching into the self-sustained mode.

In addition, the activation apparatus is capable of supplying an input current from the storage battery to the fuel cell, and then notifying the fuel cell of the characteristics of the input current. With this, the activation apparatus notifies the fuel cell of the characteristics of a current while supplying the fuel cell with the current having a stabile magnitude, and thus it is possible to activate the fuel cell with enhanced stability. In addition, the activation apparatus is capable of simplifying control by causing the control of the second switch to link to the first switch.

In addition, the activation apparatus is capable of implementing switching of currents by changing the connections between the fuel cell, the storage battery, and the system power supply. In addition, the activation apparatus is capable of implementing switching of transmission of a result of detection performed by the sensor, by changing the connections between the fuel cell, the first sensor, and the second sensor.

In addition, the activation apparatus is capable of supplying the fuel cell with an alternating current generated with use of a direct current outputted from the storage battery.

In addition, the activation apparatus is capable of reducing occurrence of wasteful power consumption in the DC/AC converter. Before the first switch is switched so that the current outputted by the storage battery is supplied to the fuel cell, there is no circuit which consumes the alternating current outputted from the DC/AC converter. In such a case, it is possible to prevent power consumption in the DC/AC converter by putting the third switch into the non-conductive state.

In addition, the activation apparatus is capable of starting supplying of a current after a circuit for supplying the current from the storage battery to the fuel cell is established, and then notifying the fuel cell of the characteristics of the input current. With this, the activation apparatus is capable of activating the fuel cell with enhanced stability while reducing wasteful power consumption in the DC/AC converter, in addition, the activation apparatus is capable of simplifying control by causing the control of the second switch and the third switch to link to the first switch.

In addition, the activation apparatus is capable of switching a source of current supply from the system power supply to the storage battery based on an explicit operation by a user. Assuming that the above-described switching is automatically performed when the system power supply is put into a power failure state, there is a possibility that the activation apparatus activates the fuel cell regardless of whether or not a user needs electric power. It is desirable not to activate a fuel cell when it is not necessary to activate the fuel cell for such a reason that a user is away from home, and so on. Thus, the activation apparatus is capable of activating the fuel cell when the user needs activation of the fuel cell.

In addition, the activation apparatus is capable of switching a source of current supply from the system power supply to the storage battery when the system power supply is in a power failure state. In other words, the activation apparatus is capable of activating the fuel cell regardless of whether or not a user needs electric power.

In addition, the activation apparatus is capable of supplying the electric power outputted from the fuel cell to an external appliance via the second power line.

In addition, the second power line is configured by a power line of a single-phase two-wire system. In order for the activation apparatus to supply electric power to an external appliance, there are methods of supplying from a power line of the single-phase two-wire system and supplying from a power line of the single-phase three-wire system. The activation apparatus is capable of supplying the external device with more stable electric power by supplying the external appliance with the electric power via the power line of the single-phase two-wire system.

In addition, the activation apparatus is capable of supplying an external appliance with electric power via an outlet same as that used in appliances in general.

In addition, the activation apparatus is capable of supplying the hot water storage unit with electric power outputted by the fuel cell.

In addition, the activation apparatus is capable of charging the storage battery, via the AC/DC converter, with part of the electric power outputted by the fuel cell.

In addition, the activation apparatus is capable of activating the fuel cell with use of electric power outputted by the storage battery, and subsequent to the activation, charging, via the AC/DC converter, the storage battery with part of the electric power resulting from superimposing the electric power outputted by the storage battery on the electric power outputted by the fuel cell.

In addition, the activation apparatus is supplied with electric power from the system power supply via the distribution board.

In addition, even when the storage battery comes to the end of the product's life, the activation apparatus is capable of activating the fuel cell with use of, instead of a storage battery, a battery pack that is used in a power-assisted bicycle.

In addition, the activation apparatus is capable of properly detecting, using a current sensor, the direction or the magnitude of an alternating current outputted from the DC/AC converter.

In addition, when the system power supply is in a power failure state, the first light source is capable of illuminating the first operation unit so that a user can easily operate the first operation unit.

In addition, it is possible to switch, based on an operation by a user, whether or not to supply electric power to an external appliance connected to an outlet.

In addition, it is possible allow a user to visually check whether or not it is possible to supply electric power to the external appliance connected to the outlet.

In addition, the first sensor or the second sensor is capable of detecting the characteristics of a current.

(Embodiment 3)

In this exemplary embodiment, another configuration of the activation apparatus, which is different from the configuration of the activation apparatus in Embodiment 2, will be described in more detail. It is to be noted that the constituent elements same as those in Embodiment 1 or Embodiment 2 will be assigned with the same reference numerals as those in Embodiment 1 or Embodiment 2, and description for them will be omitted in some cases.

Figure 7:
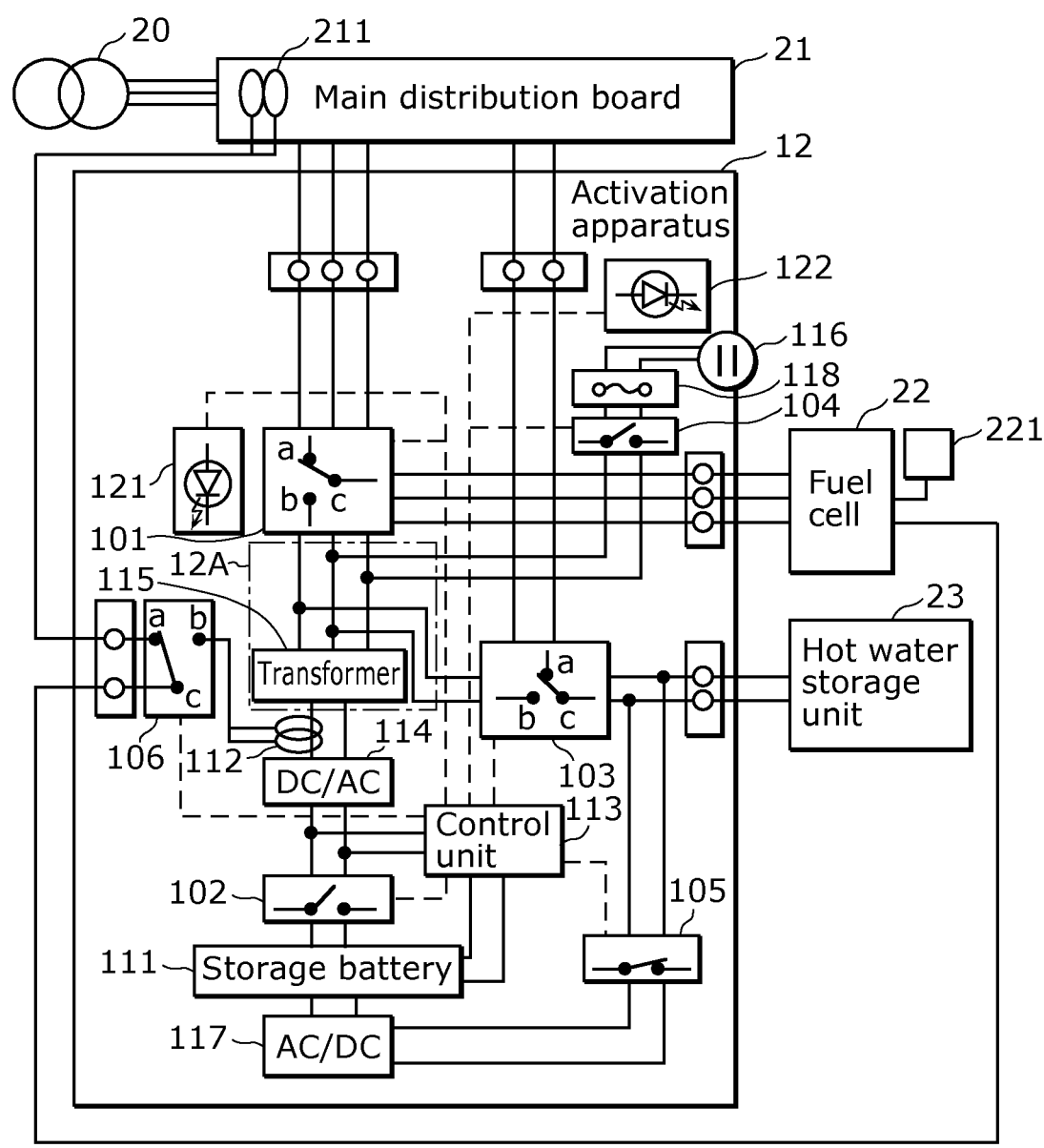
FIG. 7 is a first example of a block diagram of an activation apparatus according to Embodiment 3.

FIG. 7 is a first example of a block diagram of the activation apparatus 12 according to this exemplary embodiment. The activation apparatus 12 according to this exemplary embodiment has the constituent elements same as those in Embodiment 2, and different line connections from those in Embodiment 2. To be specific, the activation apparatus 12 is different from the activation apparatus 11 in the connection of lines around the transformer 115 (the portion of a circuit 12A illustrated in FIG. 7). More specifically, the second power line is connected to a zone on the first power line between the transformer 115 and the switch 101.

In this state, the activation apparatus 12 supplies, via the switch 101, a current provided from the system power supply 20 to the fuel cell 22. In addition, the activation apparatus 12 transmits a result of detecting, by the current sensor 211, a current provided from the system power supply 20, to the fuel cell 22 via the switch 106. The activation apparatus 12 activates the fuel cell 22 using a current provided from the system power supply 20 when the current sensor 211 detects an appropriate current. In addition, the activation apparatus 12 supplies, via the switch 103 and the switch 105, the storage battery 111 with the current provided from the system power supply 20, thereby charging the storage battery 111.

Figure 8:
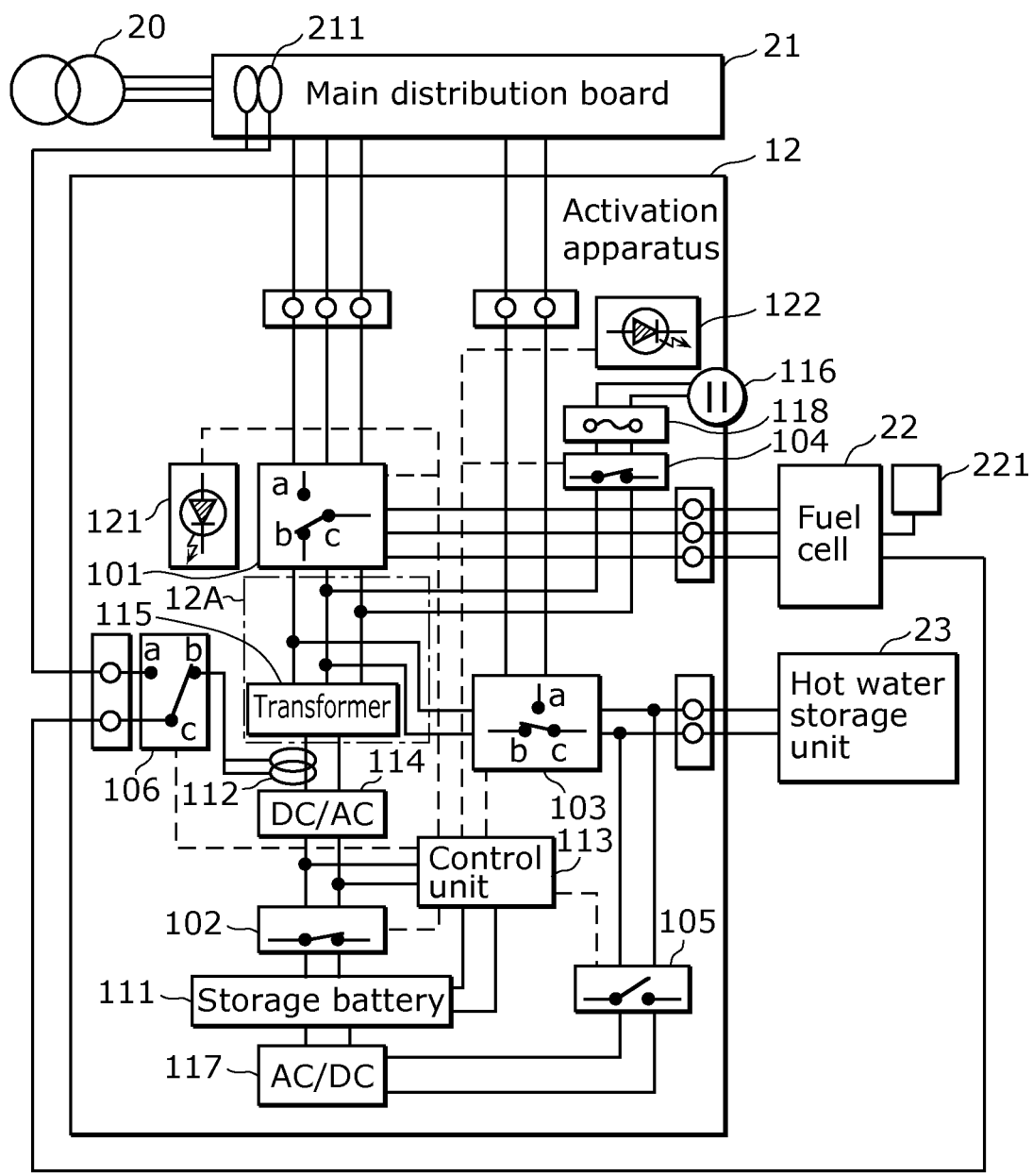
FIG. 8 is a second example of the block diagram of the activation apparatus according to Embodiment 3.

FIG. 8 is a second example of a block diagram of the activation apparatus according to this exemplary embodiment. FIG. 8 illustrates switch connection at a time when the system power supply 20 is in the power failure state. It is to be noted that line connections between each of the constituent elements are the same as those illustrated in FIG. 8.

With this configuration, the activation apparatus 12 supplies the outlet 116 with a current flowing through two of the power lines of the single-phase three-wire system, via the second power line, in addition, the activation apparatus 12 supplies the hot water storage unit 23 with a current flowing through two of the power lines of the single-phase three-wire system.

With the configuration of the activation apparatus 11 according to Embodiment 2, a current which is outputted from the fuel cell 22 and flows through the power line of the single-phase three-wire system is transformed by the transformer 115 into a current flowing through the power line of the single-phase two-wire system, and then outputted to the outlet 116 or the hot water storage unit 23. In this case, since the amount of current transformed by the transformer 115 is large, it is necessary for the transformer 115 to be implemented by a transformer with relatively large capacity. On the other hand, with the activation apparatus 12 according to this exemplary embodiment, a current which is not yet transformed by the transformer 115 and flows through the power line of the single-phase three-wire system is outputted to the outlet 116 or the hot water storage unit 23, and thus there is an advantageous effect that the transformer 115 is implemented by a transformer with relatively small capacity.

As described above, with the activation apparatus 11 according to an aspect of the present invention, the second power line of the activation apparatus is configured by a power line of the single-phase three-wire system. It is possible to reduce the electric power transformed by the transformer, by supplying electric power from the power line of the single-phase three-wire system of the activation apparatus to an external appliance, and thus the activation apparatus can be implemented with lower costs.

Figure 9:
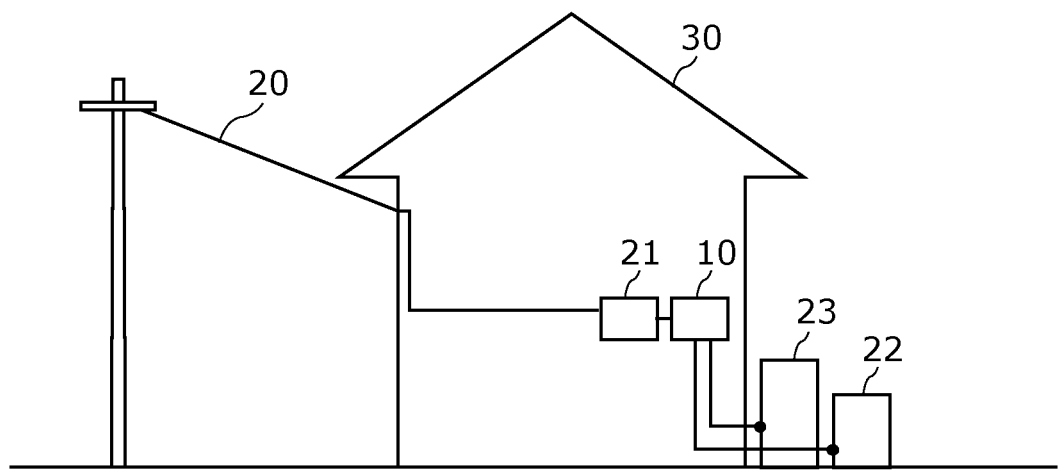
FIG. 9 is an example of disposition of the activation apparatus according to each of the embodiments.

It is to be noted that the activation apparatus described in each of the above-described embodiments may be installed indoors or may be installed outdoors. In general, the main distribution board is installed indoors and the fuel cell is installed outdoors. As illustrated in FIG. 9, by disposing the activation apparatus 10 near the main distribution board 21 installed indoors of the customer 30, it is possible to reduce the length of the line for connecting the activation apparatus 10 and the main distribution board 21. In addition, it is intuitively easy to understand for a user that the activation apparatus 10 which is an apparatus related to the main distribution board 21 is disposed near the main distribution board 21. In addition, the activation apparatus 10 installed indoors does not have to have a defense function against weather or dust outside, there is an advantageous effect that the apparatus can be implemented with light, small, and small number of components, or reduced costs (FIG. 9).

It is to be noted that the activation apparatus explained in each of the above-described embodiments can be used in the case where not only a fuel cell is newly set but also a fuel cell has already been set and is in operation. Even in the case where the fuel cell that has already been set and is in operation cannot be activated when the system power supply is in a power failure state, the activation apparatus is capable of activating the fuel cell.

Each of the structural elements in each of the above-described embodiments may be configured in the form of an exclusive hardware product, or may be realized by executing a software program suitable for each of the structural elements. Each of the structural elements may be realized by means of a program executing unit, such as a CPU and a processor, reading and executing the software program recorded on a recording medium such as a hard disk or a semiconductor memory. Here, the software program for realizing the activation apparatus according to each of the embodiments described above is a program as described below.

More specifically, the program causes a computer to execute a fuel cell activation method performed by a fuel cell activation apparatus disposed between a system power supply and a fuel cell, the fuel cell activation apparatus including: a storage battery; a first sensor which detects a current outputted by the storage battery; a first switch which switches between supplying the current outputted by the storage battery and a current provided from the system power supply; and a second switch which switches between transmitting, to the fuel cell, a result of detection performed by the first sensor and transmitting, to the fuel cell, a result of detection performed by a second sensor which detects the current provided from the system power supply, the fuel cell activation method including: detecting a current by the first sensor or the second sensor; and controlling the first switch and the second switch and thereby switching between (i) a normal mode for activating, using the current provided from the system power supply, the fuel cell based on the result of detection performed by the second sensor, and (ii) a self-sustained mode for activating, using the current outputted by the storage battery, the fuel cell based on the result of detection performed by the first sensor.

It should be noted that although the activation apparatus according to one ore more aspects is described based on the aforementioned embodiments, the present invention is obviously not limited to such embodiments. Other forms in which various modifications apparent to those skilled in the art are applied to Embodiment, or forms structured by combining structural elements of different aspects of Embodiment may be included within the scope of the one or plurality of aspects, unless such changes and modifications depart from the scope of the present disclosure.

INDUSTRIAL APPLICABILITY

The present invention is applicable to an activation apparatus which activates a fuel cell.

REFERENCE SIGNS LIST 10, 11, 12, activation apparatus
12A circuit
20 system power supply
21 main distribution board
22 fuel cell
23 hot water storage unit
30 customer
101, 102, 103, 104, 105, 106, 131, 132 switch
111 storage battery
112, 211 current sensor
113 control unit
114 DC/AC converter
115 transformer
116, 135 outlet
117 AC/DC converter
118 fuse
121, 122, 133, 134 light source
221 operation board

The invention claimed is:

1. A fuel cell activation apparatus used for a fuel cell, the fuel cell activation apparatus comprising:
   a storage battery;
   a first current path including a first switch configurable to electrically connect the fuel cell with a power system that is external to the fuel cell activation apparatus;
   a second current path including the first switch configurable to electrically connect the storage battery with the fuel cell;
   a first sensor configured to detect a current discharged from the storage battery;
   a first sensor path including a second switch configurable to connect the first sensor and the fuel cell; and
   a controller configured to control the second switch, when a current is not supplied from the power system, to execute a self-sustained mode in which the first sensor and the fuel cell are connected by the first sensor path, and configured to control the first switch to supply a current to the fuel cell from the storage battery by the second current path to activate the fuel cell.

2. The fuel cell activation apparatus according to claim 1, wherein the fuel cell activation apparatus is configured to be connected to a second sensor configured to detect a current supplied from the power system; and connected to a second sensor path including the second switch configurable to connect the second sensor and the fuel cell,
   wherein the controller is configured to control the first switch to execute a normal mode in which a current is supplied to the fuel cell from the power system by the first current path to activate the fuel cell and configured to control the second switch to connect the fuel cell to the second sensor.

3. The fuel cell activation apparatus according to claim 2, wherein, in the normal mode,
   the fuel cell is activated using the current supplied from the power system and sensor information related to at least one of a direction and a magnitude of the current supplied from the power system is detected by the second sensor, and the first sensor detects at least one of a direction and a magnitude of a current supplied from the storage battery.

4. The fuel cell activation apparatus according to claim 2, wherein the first switch switches each of the first current path and the second current path between a conductive state and a non-conductive state, the second switch switches between the first sensor and the second sensor for connecting, respectively, the first sensor and the second sensor to the fuel cell, wherein the controller is configured to perform switching between the normal mode and the self-sustained mode by controlling switching of the first switch and the second switch.

5. The fuel cell activation apparatus according to claim 4, further comprising a first operation unit configured to receive a user's operation for performing the switching between the normal mode and the self-sustained mode, and when the user's operation is received, switching is performed on the first switch and the second switch in accordance with the user's operation for performing the switching between the normal mode and the self-sustained mode.

6. The fuel cell activation apparatus according to claim 4, wherein the controller is configured to control the first switch to cause the fuel cell to be supplied with the current outputted by the storage battery when the second sensor detects that a current is not being supplied from the system power supply.

7. The fuel cell activation apparatus according to claim 2, wherein the current outputted by the storage battery is a direct current, the fuel cell activation apparatus further comprises a DC/AC converter which converts the direct current outputted by the storage battery into an alternating current and outputs the alternating current, and the first sensor detects the alternating current outputted by the DC/AC converter.

8. The fuel cell activation apparatus according to claim 6, further comprising a third switch disposed between the storage battery and the DC/AC converter, the third switch switching between causing and not causing the current outputted by the storage battery to be inputted into the DC/AC converter, wherein the controller is configured to, when the first switch is switched to cause the current outputted by the storage battery to be supplied to the fuel cell, control switching of the third switch to cause the current outputted by the storage battery to be inputted into the DC/AC converter.

9. The fuel cell activation apparatus according to claim 8, wherein the controller is configured to, when the first switch is switched to cause the current outputted by the storage battery to be supplied to the fuel cell, control the second switch to cause the first sensor to be connected to the fuel cell, after controlling the switching of the third switch to cause the current outputted by the storage battery to be inputted into the DC/AC converter.

10. The fuel cell activation apparatus according to claim 6, further comprising:

a first power line connecting the first switch with the DC/AC converter; and a second power line connected to the first power line, the second power line being for supplying a current to an external appliance outside the fuel cell activation apparatus.

11. The fuel cell activation apparatus according to claim 9, further comprising an outlet connected to the second power line, the outlet being for connecting the external appliance.

12. A fuel cell activation system, comprising:

the fuel cell activation apparatus according to claim 1, and the fuel cell which is activated by the fuel cell activation apparatus.

* * * * *